(12) United States Patent
Velde et al.

(10) Patent No.: US 6,637,851 B2
(45) Date of Patent: Oct. 28, 2003

(54) COLOR HALFTONING FOR PRINTING WITH MULTIPLE INKS

(75) Inventors: Koen Van de Velde, Duffel (BE); Paul Delabastita, Antwerp (BE)

(73) Assignee: Agfa-Gevaert, Mortsel (BE)

( * ) Notice: Subject to any disclaimer, the term of this patent is extended or adjusted under 35 U.S.C. 154(b) by 17 days.

(21) Appl. No.: 10/081,524

(22) Filed: Feb. 22, 2002

(65) Prior Publication Data

US 2002/0186267 A1 Dec. 12, 2002

Related U.S. Application Data

(60) Provisional application No. 60/292,635, filed on May 22, 2001.

(30) Foreign Application Priority Data

Mar. 9, 2001 (EP) .............................................. 01000053

(51) Int. Cl.$^7$ ................................................. B41J 2/205
(52) U.S. Cl. .............................. 347/15; 347/43; 358/518
(58) Field of Search ...................... 347/15, 43; 358/1.9, 358/516, 518, 529, 530, 501

(56) References Cited

U.S. PATENT DOCUMENTS 6,483,606 B1 * 11/2002 Klassen et al. .............. 358/1.9

FOREIGN PATENT DOCUMENTS

| EP | 0 895 408 A2 | 2/1999 |
| EP | 0 982 932 A2 | 3/2000 |
| EP | 1 073 260 A2 | 1/2001 |

* cited by examiner

Primary Examiner—Lamson Nguyen
(74) Attorney, Agent, or Firm—John A. Merecki; Hoffman, Warnick & D'Alessandro (57) ABSTRACT

The method reproduces on an output device an electronic image having color pixels, each color pixel being represented by K spatially corresponding component pixels, K>1, each component pixel having an input pixel value, the output device being capable of rendering $N_j$ intensity levels for a component pixel j, $1 \leq j \leq K$, thereby defining $N_1*N_2* \ldots *N_K$ intensity level combinations, the method comprising the steps of:

computing for any color pixel a scalar value which is a function of at least one of said input pixel values of said spatially corresponding component pixels;

quantizing said scalar value by a multilevel halftoning process to obtain for said color pixel a quantized scalar value;

using said quantized scalar value to select, out of all said intensity level combinations, a subset of intensity level combinations;

selecting one combination out of said subset;

using said selected combination for reproducing said color pixel by said output device.

In a specific embodiment the multilevel halftoning process is a multilevel error diffusion process.

10 Claims, 6 Drawing Sheets

COLOR HALFTONING FOR PRINTING WITH MULTIPLE INKS

This application claims the benefit of U.S. Provisional Patent Application No. 60/292,635, filed May 22, 2001.

FIELD OF THE INVENTION

The present invention relates to a method for halftoning of colour images. In a specific embodiment the invention is related to an improved method for halftoning images using error diffusion.

BACKGROUND OF THE INVENTION

Traditionally halftoning images for printing is done using only two levels. The continuous tone density value of an input pixel to be reproduced is approximated by printing an appropriate percentage of dots within an area representing the pixel. At a particular position of the binary reproduction either a dot or no dot can be placed. It can be considered that a continuous tone image is an image containing multiple grey levels with no perceptible quantization to them.

Figure 1:
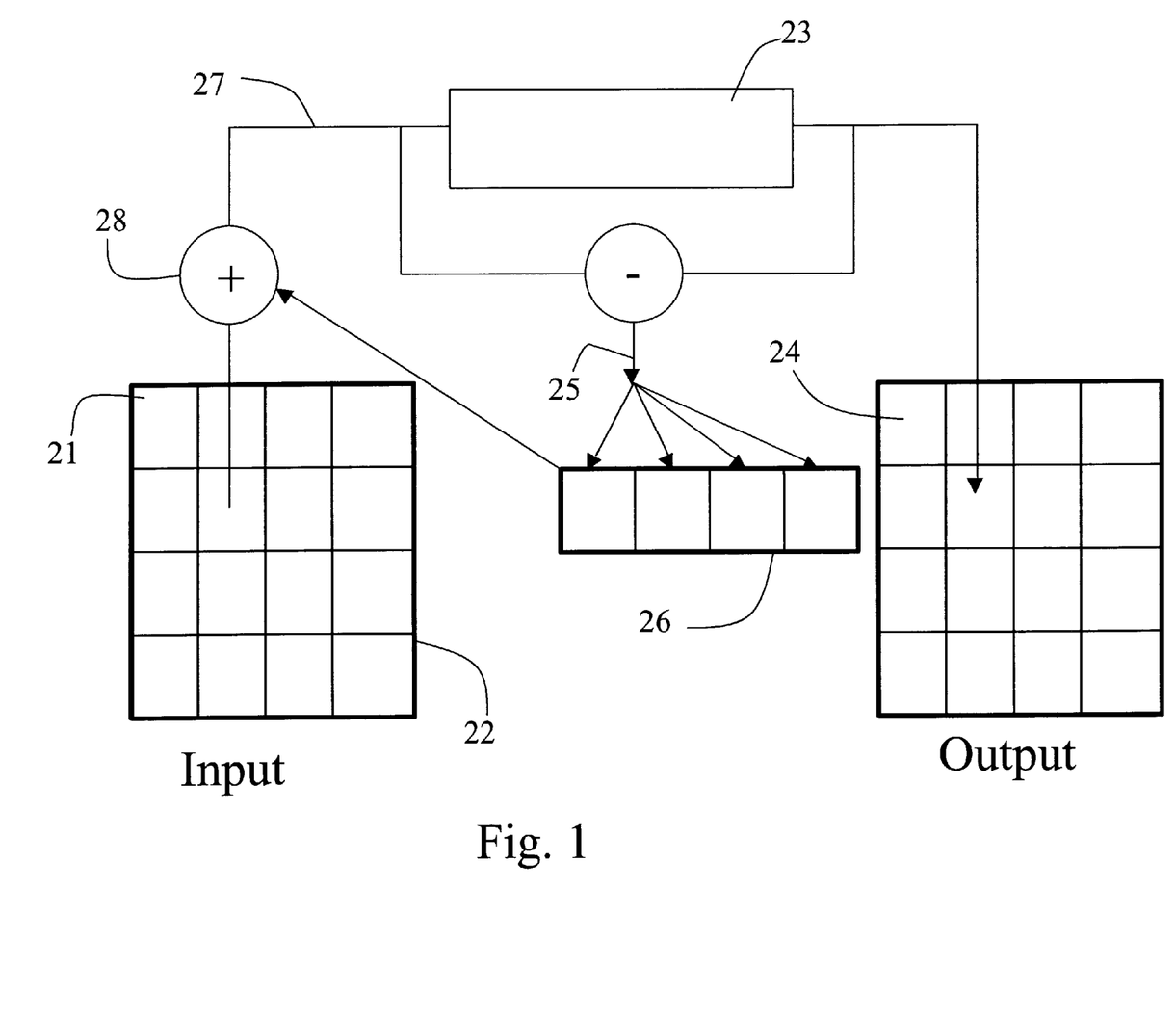
FIG. 1 shows an error diffusion system according to the prior art

Error diffusion is a well-established halftoning technique, especially fit for printers that are able to produce dispersed dots, like inkjet printers. Error diffusion algorithms exist for both grey-level images and colour images. The basic error-diffusion algorithm works as follows and is illustrated in FIG. 1. The first input pixel value 21 of the original image 22 is quantized by the quantizer to the nearest allowed output value (reproducible level) of the output system to obtain the output pixel value 24. The quantization error 25, i.e. the difference between the continuous tone input value and the output pixel value 24, is stored in an error buffer 26 and is later diffused to future pixels. For following pixels the input pixel value 21 is modified by the content of the error buffer 26 resulting in modified input pixel value 27 which is fed to the quantizer.

The simplest way to extend the algorithm from grey scale to colour is to perform the grey-scale algorithm separately on each colour component or component image of the colour-separated image, e.g. Cyan, Magenta, Yellow for a 3-ink device where there are 3 colour components; or, Cyan, Magenta, Yellow, Black for a 4-ink device where black is also colour component and there are 4 colour components.

Each colour component contains pixels which correspond spatially to pixels in other colour component separations. The result of the extended algorithm for a pixel is formed by the combination of the result obtained from the algorithm for spatially corresponding pixels in each colour component.

Error diffusion performed on an image or image component, where each pixel is represented by a single number, is called a scalar error diffusion.

The alternative is to make explicit use of the three-dimensionality of colour space and to diffuse a three dimensional colour-error vector instead of 3 or 4 scalar ink errors. This approach was described by Sullivan et al. in patent U.S. Pat. No. 5,070,413 for binary colour images. For n inks, there are $2^n$ basic (i.e. printable) colours in a binary device. A pixel's colour is mapped to the closest basic colour, and the resulting colour error vector is diffused to the unprocessed neighbouring pixels. See e.g. Ronald S. Gentile, Eric Walowit, and Jan P. Allebach. Quantization and multilevel halftoning of colour images for near original image quality. *J. Opt Soc. Am. A* Vol. 7, 1019–1026.

The procedure is readily extended to multi-level printing. In contrast to binary printers that can attain only two values per ink (ink/no ink), multi-level printing devices can attain more density values by either varying the ink-drop size or the ink density. For a printer capable to produce k levels for all n inks, the number of basic colours equals $k^n$. Again, an input pixel's colour is mapped to the closest basic colour in the multilevel output system, and the resulting colour error vector representing the difference between the input colour and the reproduced output colour is diffused to the unprocessed neighbouring pixels.

The original contone image is typically quantized to 256 values per colour component.

Due to restrictions of the output system, the reproduced halftone image contains much less different colour values, resulting in a visual difference between the original contone image and the reproduced halftone image.

Effort has been made to minimise the visual difference between the original and the reproduced image.

First of all, the method of error diffusion itself does quite a good job because of its "blue-noise" characteristic. This means that the resulting difference contains predominantly high-frequency errors, which are less visible to the eye than lower-frequency errors.

More investigation on this blue-noise characteristic has led to variants of the basic error-diffusion algorithm. See e.g. Robert A. Ulichney. Dithering with blue noise. *Proceedings of the IEEE*, 76(1):56–79, January 1988.

Further incorporation of characteristics of the human visual system is described in the above-mentioned Sullivan patent U.S. Pat. No. 5,070,41. Here the error vector is blurred according to a model of the human modulation transfer function. It takes into account human contrast sensitivity data. Contrast in relation to colour images can be defined as a difference in colour which is a combination of brightness, hue and chroma.

More attempts have been made since then, to optimise halftoning algorithms with respect to contrast sensitivity.

A great deal of effort has gone to incorporating the shape of the contrast sensitivity curve into halftoning algorithms. Much less attention has been paid to differences in contrast sensitivity between luminance and chrominance channels. In view of the blue-noise characteristic of error diffusion, the high-frequency side of the contrast sensitivity curves is most important. We refer to a red-green or blue-yellow grating as discussed in: Kathy T. Mullen. The contrast sensitivity of human colour vision to red-green and blue-yellow chromatic gratings. J. Physiol. 359, 381–400, 1985. When comparing the contrast sensitivity curves measured from monochrome gratings with those of coloured gratings, it is immediately clear that high-frequency errors in the luminance channel are more noticeable than those in the chrominance channels. This implies that isolated dots will be far more noticeable when they differ in luminance with their background than when they differ in chrominance and have a similar luminance. A good halftoning method should take that into account. A method that does so is described in U.S. Pat. No. 5,991,438 (Shaked, Arad, Fitzhugh, Sobel, McGuire), where the set of output halftone colours is limited to tetrahedra in colour space to minimise dot-brightness contrast in the output image.

Another issue concerns the visibility of dot patterns of the dots from colours similar in luminance. If e.g. a colour is printed by placing few darker pixels in between lighter ones, the dot pattern of these darker pixels is important. These dots should have an homogeneous appearance. Colour-error diffusion does not fully solve this problem. Moreover, normal colour-error diffusion is not optimal with respect to printer deficiencies such as misalignment. This method picks out the closest possible output colour in a colour space, mostly three-dimensional, but this can yield awkwardly discontinuous separation images, which cause colour shift if the print heads are not perfectly aligned.

An interesting approach to the problem is given in U.S. Pat. No. 5,621,546 (Klassen, Eschbach, Bharat), where a guiding ink-error-diffusion process is used to assist the colour-error diffusion. This ink-error diffusion is a bi-level process. In addition, a distorted colour space is used for the colour-error diffusion. Whereas the Shaked patent U.S. Pat. No. 5,991,438 does not fully takes into account the dot pattern problem, the Klassen patent U.S. Pat. No. 5,621,546 runs short in discriminating multiple levels of luminance. In addition, both patents leave undiscussed the matter of printing with more than 3 inks.

None of the prior art documents takes account of both the dot brightness contrast and the dot pattern visibility problems at the same time resulting in undesirable drawbacks as mentioned herein above.

OBJECTS OF THE INVENTION

It is an object of the present invention to provide an improved method for halftoning colour images in a binary or multilevel halftone colour reproduction system avoiding unwanted colour density deviations.

It is a further object of the invention to minimise dot appearance in a binary or multilevel halftoning.

SUMMARY OF THE INVENTION

The above-mentioned objects are realised by a method having the specific features set out in claim 1. Specific features for preferred embodiments of the invention are set out in the dependent claims. An apparatus for realising the method is set out in claim 10. Further advantages and embodiments of the present invention will become apparent from the following description and drawings.

A colour component of a colour image is an image obtained after colour separation of an input image and which represents the information of a single colour of the input image. In a 3 colour ink process, e.g. a cyan, magenta, yellow process, the input image can be separated into 3 separate images, a cyan colour component containing the image information regarding the cyan ink, and likewise a magenta en yellow colour component containing the information about magenta en yellow inks respectively.

The colour image comprises colour pixels while the colour components comprise component pixels.

In a cmyk system there are 4 colour components wherein the 4-th colour component is formed by the information about the black (k) ink.

Generally a K-ink system has K colour components.

It is also possible to use different inks having the same chromaticity but different density e.g. two kinds of magenta ink. The information about the use of each ink then can be considered as a separate colour component. Even when reproducing a grey scale image by using 2 grey inks having a different density, it can be considered that each ink provides a different colour component. One can also consider it as being a single component having multiple levels.

The term corresponding pixels refers to component pixels from different colour components representing information of a colour pixel of a spatially corresponding part of the input image or reproduced image. When the colour component images all have the same resolution and the same location on e.g. a page, the component pixels having the same co-ordinates in each matrix of each colour component form a set of corresponding pixels. Other systems may be possible. It is possible to have one or more colour components at a different resolution. The yellow component can e.g. have a resolution of 12×12 dots/mm (300×300 dpi) while the other components can have a resolution of 24×24 dots/mm corresponding to 600×600 dots per inch. The input pixel value of the yellow colour component can then serve as value to determine the output pixel value for 4 output pixels of an output image having a resolution of 24×24 dots/mm (600×600 dpi).

The term input pixel value refers to the value of a pixel read from the input image or colour component which is delivered to the quantizer. This value can be modified before it is fed to the quantizer.

This can be the pixel value of a colour component pixel or a colour pixel or a scalar value of a pixel. In error diffusion methods the input pixel value can be modified by the addition of errors out of the error buffer. Certain methods even further modify the input pixel value in order to avoid disturbing artefacts.

The term intensity level refers a density level which can be rendered by an output device. The intensity level of a pixel corresponds to the output pixel value for that pixel. In a system where only two different density levels can be reproduced, ink or no ink, it is a bi-level system where the intensity can be minimal corresponding to a output value 0, and or maximal corresponding to the output value 1. In a multi-level system several output densities can be reproduced corresponding to several output pixel values. As mentioned above, this can be done in an ink-jet system by Drop size, drop count or ink density variation.

When a device having K colour components or colorants is capable of reproducing $N_j$ intensity levels for colorant j, $1 \leq j \leq K$, it is possible to reproduce $N_1 * N_2 * \ldots * N_K$ different colours defined by the complete set of intensity level combinations which can be made. Out of the input pixel colour component values a single number or a scalar can be calculated. A possible value which can be calculated is a brightness value (B) which may be represented in a cmy 3-ink system having only two levels for each colour by $$by\ B = 3 - c - m - y$$

where c, m, y are the pixel values for each colour component respectively.

An alternative scalar value I representative for the amount if ink deposited may be calculated where I=3−B.

Also other scalar values may be calculated based upon at least one of the three pixel values. These scalar values may represent several parameter such as gloss, etc.

When calculating a scalar value for each colour pixel of an input image, an new image is obtained having the scalar value as pixel value.

A multilevel halftoning process refers to a process for reducing the number of levels in an image.

A continuous tone image is an image containing multiple levels with no perceptible quantization to them. By the multilevel halftoning process the multiple levels are reduced to a lower number of levels. Contrary to bi-level halftoning, multilevel halftoning provides more than two levels as output value. The multilevel halftoning can process the input pixel values as read from the input image, but also an image obtained by calculating a scalar value for each pixel can be processed by a halftoning algorithm.

Possible halftoning processes are a multi-level screening procedure or multi-level error diffusion.

An example of multi-level error diffusion is multi-level Floyd-Steinberg error diffusion, an extension of the algorithm by Floyd and Steinberg, see FLOYD R W and STEINBERG L, An adaptive algorithm for spatial grey scale, Society for Information Display 1975 Symposium Digest of Technical Papers, 36–37 (1975). In this algorithm the image pixels are processed in a sequential way.

An alternative way to reduce the number of gradation levels is the use of multi-level screening techniques instead of error diffusion.

It has the advantage over the above-mentioned tetrahedral method that dot positions are less correlated. In contrast to the Klassen method U.S. Pat. No. 5,621,546 that uses a distorted colour space and a bi-level guiding error-diffusion, the current invention has no specific need to use a distorted colour space and a multilevel guiding error-diffusion, which discriminates between multiple luminance levels. Below is explained how the method according to the current invention can be implemented for multilevel printing processes, and for printing with more than 3 inks.

DETAILED DESCRIPTION OF THE INVENTION

In the current invention, a multilevel brightness-halftoning process serves as a guide for the colour-error-diffusion process. This both tackles the dot brightness contrast and dot pattern visibility in an efficient way.

Specific cases using a binary cmy (Cyan, Magenta, Yellow) inkjet and a multilevel cmy system will be described hereinafter. A general procedure for using the method and further examples are given below Bilevel CMY Printing When using a cmy bi-level system as output system, it is clear that only a limited combinations of colorants can be used to represent the pixels of the electronic colour input image.

No ink is deposited.
Only a single ink drop is deposited (c or m or y)
An overprint of two drops is performed (cm, cy, my)
The three inks are overprinted (cmy)
Thus in total only eight combinations ($2^3$) are possible.

Since the importance of the brightness direction in colour space is recognised, it is advantageous that brightness obtains a special role in the method according to the current invention. To the cmy printing process an RGB-space we can be associate in the following simple way:
r=1−c,
g=1−m,
b=1−y.

Figure 2:
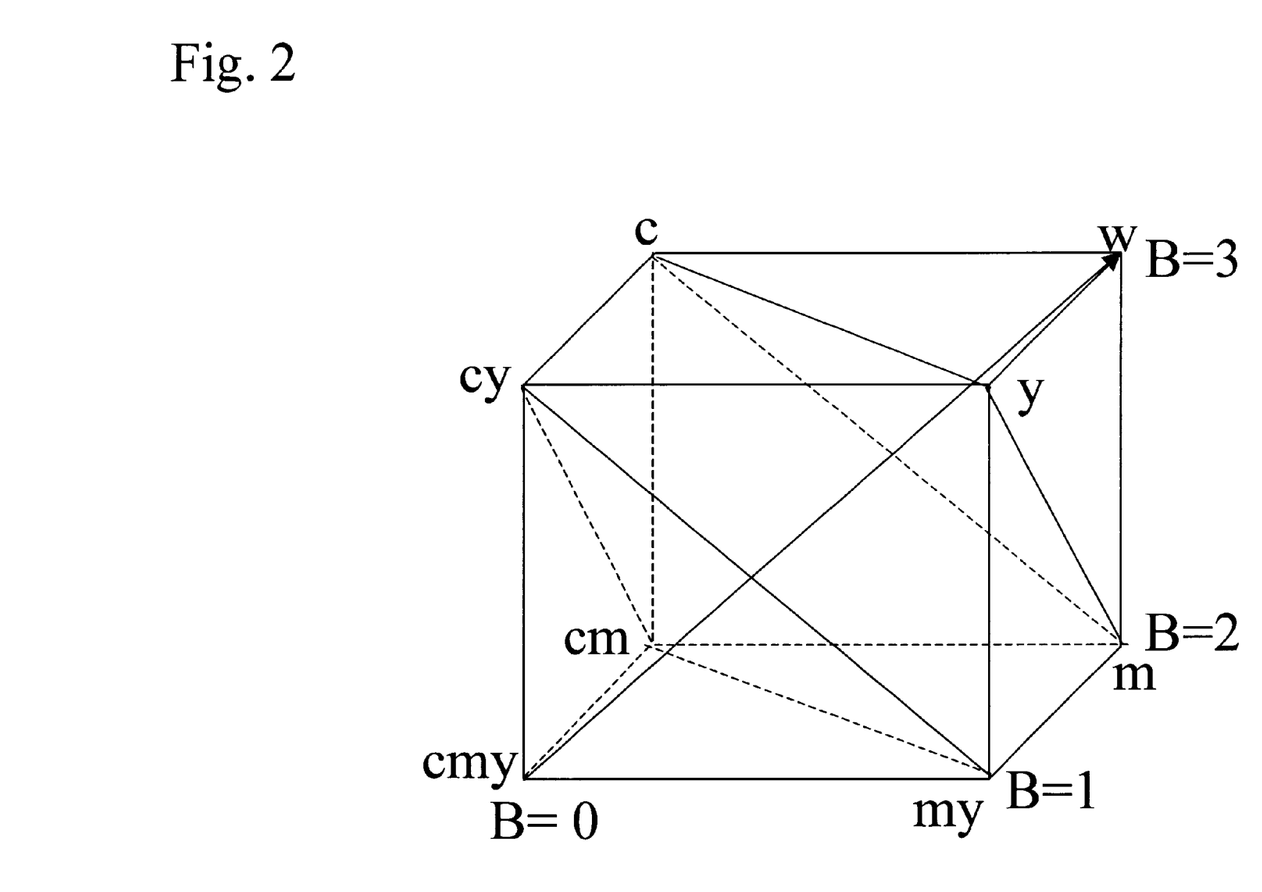
FIG. 2 shows brightness levels (B) in a cmy binary system

For simplicity it is assumed that the r, g, b, c, m and y are normalised to the interval [0.0–1.0]
r,g,b=0.0 means lowest intensity for red, green, blue respectively
r,g,b=1.0 means highest intensity for red, green, blue respectively
c,m,y=0.0 means lowest density for cyan, magenta, yellow respectively
c,m,y=1.0 means highest density for cyan, magenta, yellow respectively Referring to FIG. 2 it can be seen that the brightness B may e.g. be represented in this rgb-space by B=r+g+b. In the case of three inks cmy, and two levels—for an inkjet printer a droplet of a particular colour or no droplet at a pixel position—B actually has 4 quantization levels:
0 for an overprint of cmy (=black),
1 for overprints of my,cy,cm (=r,g,b),
2 for single droplets of c,m,y and
3 for no droplet (=white);

It is noticed that the number (I) of ink droplets at a particular pixel is I=3−B, so that I refers to the amount of ink and B refers to the brightness in this case. Since B or I takes 4 possible values, we have found that it is adequate to use e.g. a 4-level error-diffusion process to halftone this brightness component B.

In a first step, halftoning of the brightness value B of the input colour value is performed. This results in determination of a brightness value B for the output pixel.

Subsequent colour halftoning is performed using the input pixel colorant values. The outcome of the brightness error-diffusion may be used as a guide to choose the right colour for quantizing the input colour value when performing the colour halftoning.

Preferably, the quantized colour is limited to a colour, i.e. intensity level combination of the colorants, to a subset of combinations having a brightness level corresponding to the obtained brightness level of the halftoning process, preferably a brightness error diffusion:
if the quantized B-value is equal to 0, then cmy is be printed;
if B=1 then there is a choice between my, cy, and cm;
if B=2 then there is a choice between c, m and y;
if B=3 then no dot is printed.

The actually selected quantized output pixel colorant value is preferably the one of the allowed colours of the selected subset that is closest to the modified pixel colorant value 27. The modified pixel colorant value is: original pixel colorant value 21+colorant quantization error 25 from past pixels. The "closest" is preferably defined in the sense of the Euclidean distance in the rgb-space, or equivalently in the cmy space. This means that the error is diffused in the same way as in state of the art vector error-diffusion. The scheme of a guided error-diffusion method according to the current invention is presented in FIG. 3. The brightness error diffusion process 29 operates independently from the colour error diffusion 30, as if the brightness error diffusion process was halftoning a single grey-scale image with 4 levels. The output of the brightness error diffusion 31 is used as a switch in the colour quantization step 32.

Figure 3:
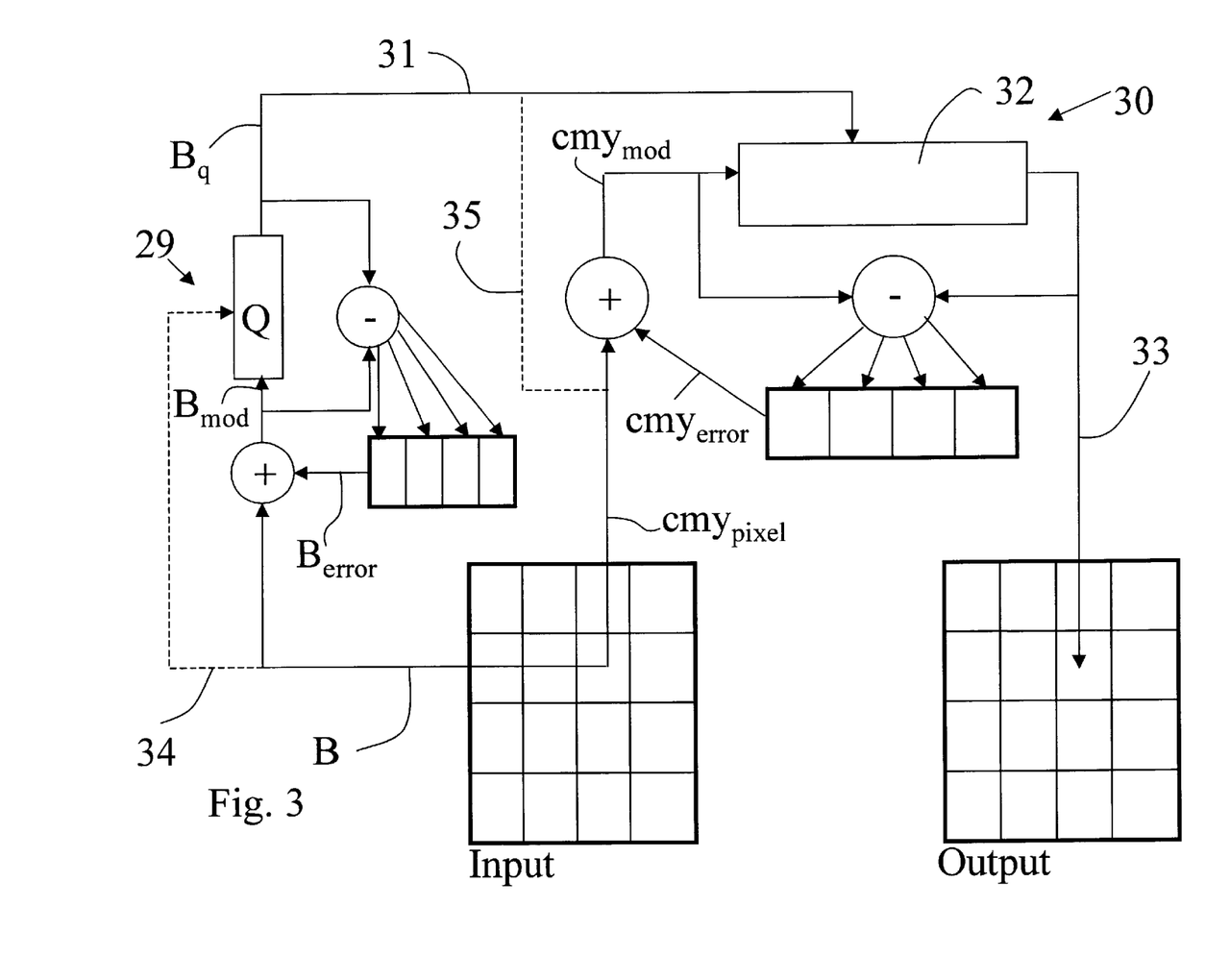
FIG. 3 shows an improved colour error diffusion circuit using the method according to the invention

This results in an output pixel colour value 33 without deviating brightness value.

Following numerical example illustrates the procedure of the method using error diffusion halftoning algorithms when processing a image in a binary cmy system.

Starting Values
$cmy_{pixel}$=(0.2,0.6,0.4) gives the input pixel values of the pixel to be processed.
$B_{error}$=−0.1 represents the brightness error which is to be transferred from previous processed pixels.
$cmy_{error}$=(0.0,−0.2,0.1) gives the colour error to be transferred to the pixel to be processed.

Computation of the Scalar Value
Out of the $cmy_{pixel}$ the value B=3−c−m−y can be computed giving

B=3−0.2−0.6−0.4=1.8

Adding the $B_{error}$ gives the modified brightness scalar value $B_{mod}=B+B_{error}=1.8+(-0.1)=1.7$ quantization of the scalar value The modified brightness value $B_{mod}$ will be quantized to the nearest Brightness level resulting in the $B_Q=2$ while a remaining error 2−1.7=−0.3 is to be transferred to future pixels via the error buffer of the brightness quantizer.

selection of the limited set of intensity level combinations.

As $B_Q=2$ the limited set B2 of allowed intensity levels is formed by {(1,1,0), (1,0,1), (0,1,1)} selecting one combination out of the limited set

The halftoning algorithm which in this case is also an error diffusion algorithm gives following result:

The modified intensity pixel values are:

$cmy_{mod}=cmy_{pixel}+cmy_{error}=(0.2,0.6,0.4)+(0.0,-0.2,0.1)=$ (0.2,0.4,0.5). These intensity values will be quantized to the closed possible combination out of the limited set B2 which is (0,1,1) leaving a resulting error of (0.2,−0.6,−0.5) to be diffused to pixels to be processed later.

Multilevel CMY Printing

Figure 4:
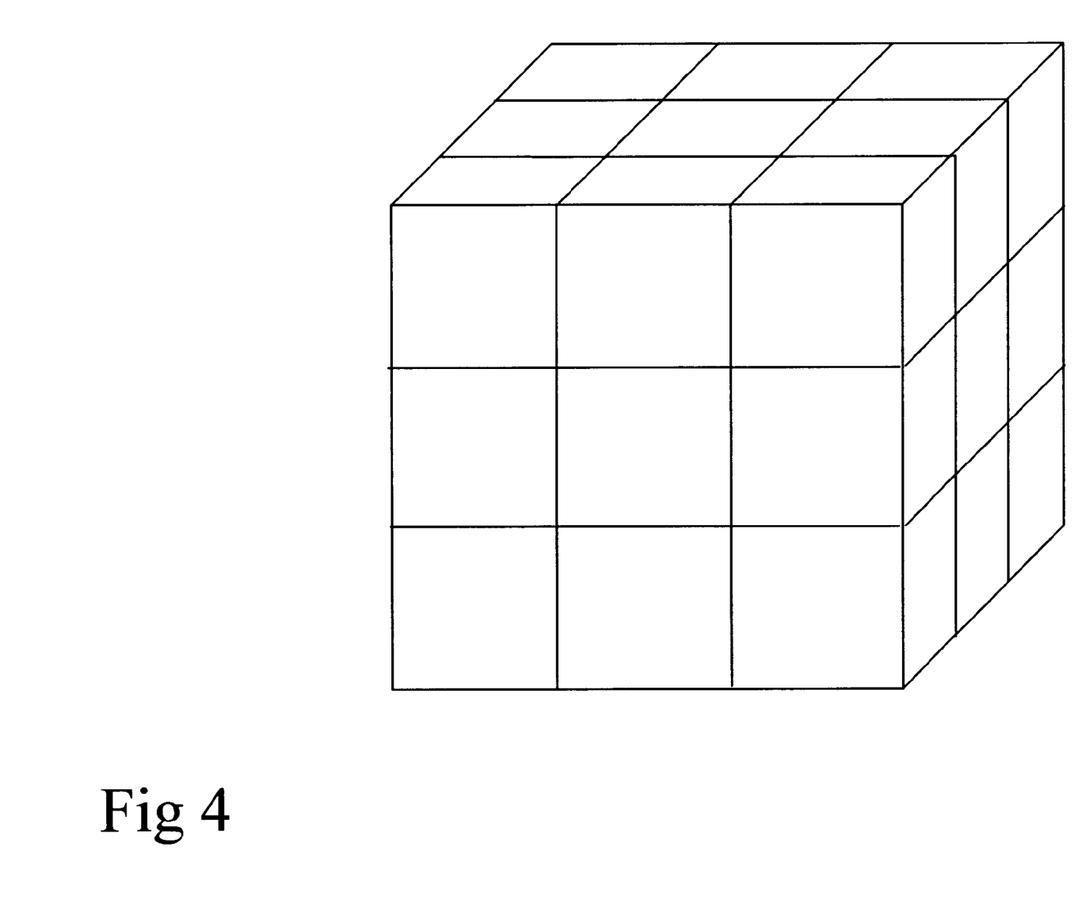
FIG. 4 shows sub-cubes forming a colour cube

According to an embodiment of the current invention, the above procedure can be extended multilevel colour error-diffusion. Suppose that the output system is capable to record N>2 multiple densities $D_0, D_1, \ldots D_{N-1}$ or droplet sizes of each of the three inks (c,m,y), resulting in N>2 intensity levels $I_0, I_1, \ldots, I_{N-1}$ for each of the three basic colours. For N density levels, $D_0, D_1, \ldots D_{N-1}$, there are M=1+3*(N−1) possible brightness values $B_j$ (j ⊂ 1 . . . M) of B=r+g+b. The guiding Brightness halftone process may use M intensity levels. E.g. for 4 different ink densities, N=4 and M=10. As depicted in FIG. 4 the N levels for each of the three colours, divide the rgb-cube into $(N-1)^3$ sub-cubes. To reduce the number of computations as well as to improve the quality of the halftoning, the quantization colour of a pixel is preferably restricted to be one of the colours situated on the corners of the sub-cube in which the original colour of that pixel is situated.

Furthermore, Preferably the quantized B-value for a pixel is restricted by a brightness value restriction 34 to be the one just above or below (or on) the original B-value of that pixel. This restriction 34 can also be used in the above case of two levels per ink. A further output colour restriction 35 can be provided out of the original input values. A possible restriction can be that the output colour has to be close to the input colour, avoiding the reproduction of excessive deviating colours due to deviations introduced by halftoning methods providing a more homogeneous dot distributions. These two restrictions are indicated in the scheme of FIG. 2 with dashed lines. Combining these two restrictions 34, 35 normally yields a non-void set, containing either 1 or 3 colours, of quantization colours for a particular pixel. This limiting set is then preferably fed into the quantizer 32 of the colour halftoning process. The colour error is again diffused in the same way as in the state of the art vector error-diffusion.

The number of attainable levels needs not to be the same for each ink. An example is the 5-ink process that uses one yellow ink (y); two cyan inks with different densities c1 and c2 with density of c2 larger than that of c1; and, two magenta inks with different densities m1 and m2 with density of m2 larger than that of m1. In this example the inks c1 and c2, m1 and m2 provide the multiple levels for c and m using different ink densities. As indicated above, in other embodiments multiple levels can reproduced by using drop-size variation or drop count variation.

Figure 5:
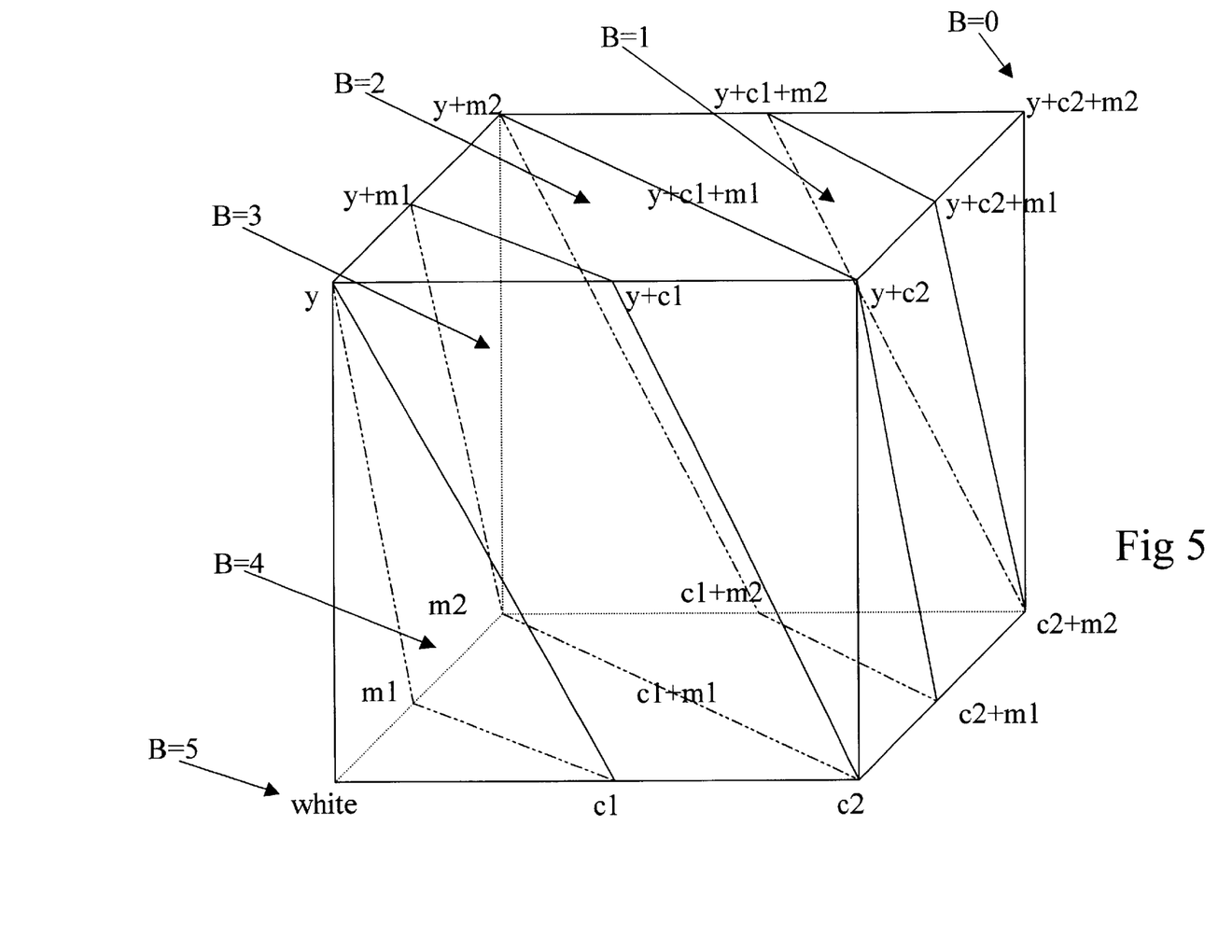
FIG. 5 depicts equiluminance planes in a 2c2my system.

Suppose that overprints of c1 and c2, or, m1 and m2 are not used. Then $N_{yellow}=2$, $N_{cyan}=3$, $N_{magenta}=3$. The number M of B-levels is represented on FIG. 5 by points and planes. That number $M=1+(N_{yellow}-1)+(N_{cyan}-1)+(N_{magenta}-1)=6$. The B-level sets which can be selected are:

B0={yc2m2} for B=0,
B1={yc1m2,yc2m1,c2m2} for B=1,
B2={c1m2,c2m1,yc2,ym2,yc1m1} for B=2,
B3={c1m1,yc1,ym1,c2,m2} for B=3,
B4={y,c1,m1} for B=4, and
B5={w} for B=5.

The number of sub-cubes is equal to $(N_{yellow}-1)*(N_{cyan}-1)*(N_{magenta}-1)=4$.

Cube 1: {w,c1,m1,m1c1,y,yc1,ym1,yc1m1}
Cube 2: {m1,m2,c1m1,c1m2,ym1,ym2,yc1m1,yc1m2}
Cube 3: {c1,c2,c1m1,c2m1,yc1,yc2,yc1m1,yc2m1}
Cube 4: {c1m1,c2m1,c1m2,c2m2,yc1m1,yc1m2,yc2m1, yc2m2}, The combination of the restriction in brightness value and the restriction imposed by the sub-cubes results in 16 quantization sets Q1={w}=Cube 1∩B5
Q2={y,m1,c1}=Cube 1∩B4
Q3={c1m1,yc1,ym1}=Cube 1∩B3
Q4={yc1m1}=Cube 1∩B2
Q5={m1}=Cube 2∩B4
Q6={ym1,m2,c1m1}=Cube 2∩B3
Q7={c1m2,yc1m1,ym2}=Cube 2∩B2
Q8={yc1m2}=Cube 2∩B1
Q9={c1}=Cube3∩B4
Q10={yc1,c1m1,c2}=Cube 3∩B3
Q11={c2m1,yc2,yc1m1}=Cube 3∩B2
Q12={yc2m1}=Cube 3∩B1
Q13={c1m1}=Cube 4∩B3
Q14={yc1m1,c1m2,c2m1}=Cube 4∩B2
Q15={c2m2,yc2m1,yc1m2}=Cube 4∩B1
Q16={yc2m2}=Cube 4∩B0

Each of the quantization sets contains the remaining allowed values for the output pixel colorant values for the input pixel values within the sub-cubes and holding into account the pre-calculated brightness levels allowed.

Figure 6:
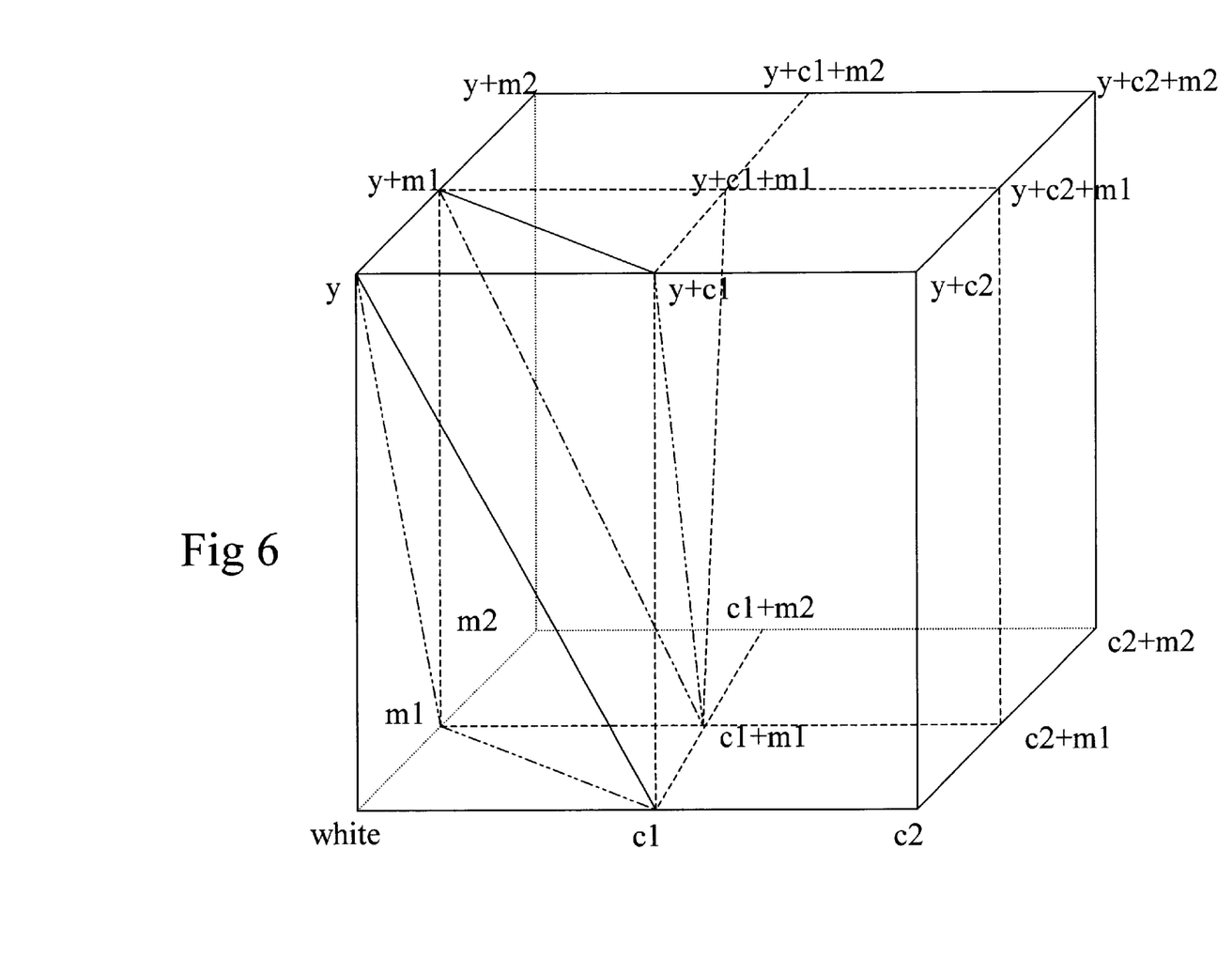
FIG. 6 depicts equiluminance planes in a 2cmy system.

It is noticed that the four B-level sets of bi-level cmy-printing are just repeated in every sub-cube (see FIG. 6). Due to the 6-level B-process it is possible to create a nice distribution of the halftone dots with respect to brightness or ink allocation. If overprints of c1 and c2 and overprints of m1 and m2 are allowed, then $N_{yellow}=2$, $N_{cyan}=4$, $N_{magenta}=4$. The number of B-levels is then $M=1+(N_{yellow}-1)+(N_{cyan}-1)+(N_{magenta}-1)=8$. The number of sub-cubes is equal to $(N_{cyan}-1)*(N_{cyan}-1)*(N_{magenta}-1)=9$, resulting in 9*4=36 quantization sets.

General Procedure

The above described method can be described in general.

Consider an image forming process using k inks or primaries wherein each ink $I_k$ has $N_k$ possible density levels. Thus $I_1$ has $N_1$ possible levels, $I_2$ has $N_2$ possible levels, . . .

For this printing process with k primaries $I_1, \ldots, I_k$, having $N_1, \ldots, N_k$ intensity levels respectively, an embodiment according to the present invention is as follows.

First a scalar value, in this case the brightness level, is determined.

The Brightness $B=(N_1-1-I_1)+(N_2-1-I_2)+\ldots+(N_k-1-I_k)$. The scalar value B in quantized using a multilevel halftoning process. The number of quantization levels for B is preferably $M=1+(N_1-1)+(N_2-1)+\ldots+(N_k-1)$ but will generally be situated in the range $k-N_1+N_2+\ldots+N_k$. Even more preferably the allowed quantized B-value for an output pixel is restricted to be the one just above or below or on the original B-value of the input pixel.

The error diffusion process applied to the B-value is an M-level error diffusion process, operating independently from the colour error diffusion. The outcome of the Brightness-error diffusion is used to guide the colour-error diffusion.

This guiding is done by selecting a set of intensity-level combinations which is a subset of the complete set of all possible intensity-level combinations.

For B=i, $0 \leq i \leq (N_1-1)+(N_2-1)+ \ldots +(N_k-1)$, the level set Bi contains all possible combinations yielding B=i.

To reduce the number of computations as well as to improve the quality of the halftoning, the quantization colour of an output pixel is restricted by an extra output colour restriction to be one of the colours situated on the corners of the sub-hypercube in which the original colour of the input pixel is situated. Each k-dimensional sub-hypercube contains $2^k$ points.

The intersection of this set of $2^k$ points with the set of points having a B-level equal to the quantized B-level that is obtained in the B-error diffusion process is non-void. The quantization colour is preferably determined to be the point in this intersection that is closest to the modified pixel colour in the k-dimensional colour space. The modified pixel colour is equal to the original input pixel colour+colour errors received from previously processed pixels. The error to be diffused is the difference between the modified pixel colour and the quantized pixel colour. This difference is calculated in each of the colour channels separately.

Further Examples

Hereinafter are given several further examples in relation to different output systems.

In the above described method, using a multi-level cmy output system, an overprint of cmy produces a black component for the printed pixel. An overprint of cmy however does not produce a pure and intense black. A way to create darker black is using a droplet of black instead of an overprint of c, m and y. In a bi-level system the dedicated black ink is used to replace every cmy overprints (B=0). This procedure may be extended to multilevel printing. In this case the black value for the output pixel K=min{c,m,y} is taken and k is subtracted from c, m, and y. E.g. the colour values c=2, m=3, y=4 for an output pixel are replaced by values k=2, c=0, m=1, y=2,. More advantage from using the black ink is obtained when the image is separated into 4 planes c,m,y, and k before halftoning. The halftoning of cmyk-separated images is discussed herein below.

CMYK Images

1. Bi-Level CMYK Printing

In a most modern output systems, the input image is provided as a cmyk-separated image.

The way to extend the above method to bi-level cmyk printing is to interpret B as an ink amount, i.e. B=4-(c+m+y+k),with c, m, y, k=0 or 1 thus B is ranging from 0 up to 4. The guiding B error-diffusion process thus takes 5 levels. The B-level sets are:

B0={cmyk}
B1={cmy,cmk,cyk,myk}
B2={cm,cy,ck,my,mk,y,k}
B3={c,m,y,k}
B4={w}

The B-value is then quantized with a 5-level error-diffusion process. The actual chosen quantization colour or ink combination is the one of the allowed colours that is closest to the modified colour value=(original colour value+ colour error from past pixels) in the sense of the Euclidean distance in the cmyk-space.

2. Multilevel CMYK Printing

For multilevel cmyk printing the number of B-levels is equal to $M=1+(N_{yellow}-1)+(N_{cyan}-1)+(N_{magenta}-1)+(N_{black}-1)$. An example is the 6-ink process that uses one yellow ink (y), two cyan inks with different densities c1 and c2 with density of c2 larger than that of c1;

two magenta inks with different densities m1 and m2 with density of m2 larger than that of m1; and, one black ink.

Again for reasons of simplicity, suppose that overprints of c1 and c2 or m1 and m2 are not allowed.

Then $N_{yellow}=2$, $N_{cyan}=3$, $N_{magenta}=3$, $N_{black}=2$.

The number of B-levels is M=7 and a specific B-level B=6-(C+M+Y+K).

The B-level sets are:

B0={yc2m2k} for B=0,
B1={yc2m2,yc1m2k,yc2m1k,c2m2k} for B=1,
B2={yc1m2,yc2m1,c2m2,c1m2k,c2m1k,yc2k,ym2k, yc1m1K} for B=2,
B3={c1m2,c2m1,yc2,ym2,yc1m1,c1m1k,yc1k,ym1k,c2k, m2k} for B=3,
B4={c1m1,yc1,ym1,c2,m2,yk,c1k,m1k} for B=4,
B5={y,c1,m1,k} for B=5, and
B6={w} for B=6.

As in previous embodiments, to reduce the number of computations as well as to improve the quality of the halftoning, the quantization colour of a pixel is restricted to be one of the colours situated on the corners of the sub-hypercube in which the original colour of that pixel is situated. Each four-dimensional sub-hypercube contains $2^4=16$ points. Furthermore, the quantized B-value for a pixel is restricted to be the one just above or below the original B-value of that pixel.

The number of sub-cubes is equal to $(N_{yellow}-1) \times (N_{cyan}-1) \times (N_{magenta}-1) \times (N_{black}-1)=1 \times 2 \times 2 \times 1=4$.

The different cubes are:

Cube 1:
  {w,c1,m1,y,k,c1m1,c1y,c1k,m1y,m1k,yk,c1m1y,c1m1k, c1yk,m1yk,c1m1yk}

Cube 2:
  {c1,c2,c1m1,c1y,c1k,c2m1,c2y,c2k,c1m1y,c1m1k,c1yk, c2m1y,c2m1k,c2yk, c1m1yk,c2m1yk}

Cube 3:
  {m1,m1c1,m2,m1y,m1k,c1m2,c1m1y,c1m1k,m2y,m2k, m1yk,c1m2y,c1m2k,c1m1yk, m2yk,c1m2yk}

Cube 4:
  {c1m1,c2m1,c1m2,c1m1y,c1m1k,c2m2,c2m1y,c2m1k, c1m2y,c1m2k,c1m1yk,c2m2y, c2m2k,c2m1yk, c1m2yk,c2m2yk}

This results in 20 quantization sets Qi by making all possible combinations of sub-hypercubes and B level sets:

Q1={w}=Cube1∩B6
Q2={y,m1,c1,k}=Cube 1∩B5
Q3={c1m1,c1y,c1k,m1y,m1k,yk}=Cube1∩B4
Q4={c1m1y,c1m1k,c1yk,m1yk}=Cube 1∩B3
Q5={c1m1yk}=Cube 1∩B2
Q6={c1}=Cube 2∩B5
Q7={c2,c1m1,c1y,c1k}=Cube 2∩B4
Q8={c2m1,c2y,c2k,c1m1y,c1m1k,c1yk}=Cube 2∩B3
Q9={c2m1y,c2m1k,c2yk,c1m1yk}=Cube 2∩B2
Q10={c2m1yk}=Cube2∩B1
Q11={m1}=Cube3∩B5
Q12={c1m1,m2,m1y,m1k}=Cube 3∩B4
Q13={c1m2,c1m1y,c1m1k,m2y,m2k,m1yk}=Cube3∩B3
Q14={c1m2y,c1m2k,c1m1yk, m2yk}=Cube 3∩B2
Q15={c1m2yk}=Cube 3∩B1

Q16={c1m1}=Cube 4∩B4
Q17={c2m1,c1m2,c1m1y,c1m1k}=Cube 4∩B3
Q18={c2m2,c2m1y,c2m1k,c1m2y,c1m2k,c1m1yk}=Cube 4∩B2
Q19={c2m2y, c2m2k,c2m1yk,c1m2yk}=Cube 4∩B1
Q20={c2m2yk}=Cube 4∩B0

Each quantization set contains either 1, 4, or 6 colours. This limiting quantization set is fed into the quantizer of the colour halftoning process. The colour error is again diffused in the same way as in normal vector error-diffusion. The number of quantization sets is 5 times the number of sub-hypercubes.

If overprints of c1 and c2, as well as m1 and m2 are allowed, then $N_{yellow}=2$, $N_{cyan}=4$, $N_{magenta}=4$, $N_{black}=2$.

The number of B-levels is equal to $M=1+(N_{yellow}-1)+(N_{cyan}-1)+(N_{magenta}-1)+(N_{black}-1)=9$.

The number of sub-hypercubes is equal to:

$(N_{yellow}-1)*(N_{cyan}-1)\times(N_{magenta}-1)\times(N_{black}-1)=9$.

Therefore, the number of quantization sets is equal to 5×9=45.

Restriction on the total ink amount (e.g. the restriction to use no more than 300% ink) may be incorporated into the technique to generate the cmyk separation. The nature of the algorithm will guarantee that this restriction may be satisfied pixelwise. This is not the case when all planes of the separation are halftoned independently.

Hexachrome Images

In this part the method starts from a Hexachrome-separated image. Hexachrome uses 6 different printing inks: cyan, magenta, yellow, black, orange, and green (denoted by c, m, y, k, o, g).

The value of brightness level B=6-(c+m+y+k+o+g). The level sets are

B0: overprint of all six inks
B1: overprints of five inks (6 possibilities)
B2: overprints of four inks (15 possibilities)
B3: overprints of three inks (20 possibilities)
B4: overprints of two inks (15 possibilities)
B5: dot of a single ink (6 possibilities)
B6: no dot Due to ink-amount restrictions in the separated image, the first B-levels —e.g. B0, B1, and B2 for a restriction to 300% ink—will preferably not be used.

The B-value is then quantized with a 6-level error-diffusion process. The actual chosen quantization colour or ink combination is the one of the allowed colours that is closest to the modified colour value=(original colour value+colour error from past pixels) in the sense of the Euclidean distance in the 6-dimensional ink space.

The extension to multilevel hexachrome printing is similar to multilevel cmyk printing.

The above example for cmyk-images with two cyan and two magenta inks may also be considered as a genuine 6 ink process and treated in the same way as a hexachrome image with B=6-(c1+c2+m1+m2+y+k). It should be noted that the method can be implemented for any multi-ink printing procedure, from duotones (printing with 2 inks), to 3,4,5,6 and even more inks.

As indicated above it is also possible to use 2 or more grey inks having a different density to faithfully reproduce a multilevel grey scale image. Each ink having a different density or grey level ink may be considered as a separate colour component.

Another embodiment according to the present invention uses not all colour components constituting the input image, but only some of them. E.g. for a cmyk image, the method is applied to the c m k components and does the halftoning of the y component independent of the other colour components.

The method according to the current invention is of particular advantage in combination with methods that are devised to yield more homogeneous dot distributions. One example is the use of an imprint function in U.S. Pat. No. 5,535,019 of Eschbach. This technique is based on threshold modulation with a function, called the imprint function, which depends on the placements of the previous dots. Whenever a dot is placed in a highlight or shadow region, the threshold used for future pixels is modified such that it inhibits the alignment of dots in worm artefacts. The imprint provides a homogenous printed spot distribution in highlighted and dark areas by an increase or decrease of the threshold level based upon a regional input level. When a white pixel is set the threshold is raised while the threshold is lowered when a black pixel is set providing less chance obtaining that another white or black pixel respectively is printed.

Modulating the threshold is equivalent to modulating the modified pixel value and therefore this method may be extended to the multilevel case, where thresholding is replaced by quantization. Other methods that yield more homogeneous dot distributions are those of Levien (U.S. Pat. No. 5,917,614) and Marcu (Journal of Electronic Imaging 9(1), 46–51 (2000)). These two methods eliminate worm artefacts by using distance constraints for dot placement. A minimum distance between dots is forced by the algorithm, depending on the grey level. It is of particular advantage to use one of these methods mentioned here on both the B-value multilevel error diffusion of the current invention as the colour-error diffusion. They can however also be used in only one of both steps.

It is clear that the method can be used for any image having more than one colour channel, and that the method is not confined to inkjet printing. The method works whenever an image is separated into different colour channels, corresponding to different colour primaries. These primaries may be subtractive, e.g. colorants in printing such as ink and toner of a particular colour; as well as additive, e.g. display primaries such as RGB phosphors. By a colour image is meant therefore any image containing more than one channel of colour information.

Having described in detail preferred embodiments of the current invention, it will now be apparent to those skilled in the art that numerous modifications can be made therein without departing from the scope of the invention as defined in the appending claims.

| Parts list |
| --- |
| 21. input pixel (colorant) value |
| 22. original image |
| 24. output pixel value |
| 25. (colorant) quantization error |
| 26. error buffer |
| 27. modified input pixel (colorant) value |
| 29. brightness error diffusion process |
| 30. colour error diffusion |
| 31. brightness error diffusion output |
| 32. colour quantizer |
| 33. output pixel value |
| 34. Brightness value restriction |
| 35. output colour restriction |

What is claimed is:

1. A method for reproducing on an output device an electronic image having colour pixels, each colour pixel being represented by K spatially corresponding component pixels, K>1, each component pixel having an input pixel value, the output device being capable of rendering $N_j$ intensity levels for a component pixel j, $1 \leq j \leq K$, thereby defining $N_1 * N_2 * \ldots * N_K$ intensity level combinations, the method comprising the steps of:

- computing for any colour pixel a scalar value which is a function of at least one of said input pixel values of said spatially corresponding component pixels;
- quantizing said scalar value by a multilevel halftoning process to obtain for said colour pixel a quantized scalar value;
- using said quantized scalar value to select, out of all said intensity level combinations, a subset of intensity level combinations;
- selecting one combination out of said subset;
- using said selected combination for reproducing said colour pixel by said output device.

2. The method according to claim 1, wherein said scalar value represents brightness or ink-allocation.

3. The method according to claim 1 wherein said scalar value is a linear combination of said input pixel values of at least two of said K colour components.

4. The method according to claim 3 wherein said scalar value is a sum of the said input pixel values of at least two of said K colour components.

5. The method according to claim 1, wherein said limited set of intensity-level combinations is a set of combinations for which said sum of said pixel values of the chosen colour components equals the quantized scalar value.

6. The method according to claim 1 wherein said multilevel halftoning process used for quantizing the scalar value is a multilevel error diffusion algorithm.

7. The method according to claim 1 wherein said limited set of output combinations is further restricted by at least one of said input pixel values of said corresponding pixels.

8. The method according to claim 7, where said further restriction comprises the step of allowing for at least one colour component only the output intensity level just below and above the input intensity level.

9. The method according to claim 1 wherein said halftoning algorithm is an error diffusion halftoning algorithm.

10. A device for reproducing an electronic image using K colorants, said electronic image having colour pixels, each pixel being represented by K spatially corresponding component pixels having an input pixel value, the device capable of reproducing $N_j$ intensity levels for colorant j, $1 \leq j \leq K$ thereby defining a complete set of $N_1 * N_2 * \ldots * N_K$ intensity level combinations comprising:

- means for calculating a scalar value for each colour pixel based upon corresponding input pixel values;
- multilevel halftoning circuit for quantizing the scalar value to obtain a quantized scalar value;
- selection means for selecting a subset of intensity level combinations out of said complete set;
- selection means for selecting one intensity level combination out of said subset;
- reproducing means for reproducing the colour pixel using said selected intensity level combination.

* * * * *